(12) United States Patent
Mauro

(10) Patent No.: US 6,813,523 B2
(45) Date of Patent: Nov. 2, 2004

(54) DISTRIBUTED PROCESS CONTROL

(76) Inventor: George Mauro, 26 Keewaydin Dr. Suite B., Salem, NH (US) 03079

( * ) Notice: Subject to any disclaimer, the term of this patent is extended or adjusted under 35 U.S.C. 154(b) by 254 days.

(21) Appl. No.: 09/935,918

(22) Filed: Aug. 23, 2001

(65) Prior Publication Data

US 2003/0041089 A1 Feb. 27, 2003

(51) Int. Cl.[7] ............................................. G05B 15/02
(52) U.S. Cl. ........................................... 700/9; 700/10
(58) Field of Search ............................. 700/4, 3, 20, 7, 700/9

(56) References Cited

U.S. PATENT DOCUMENTS

| | | | | |
|---|---|---|---|---|
| 3,579,197 A | * | 5/1971 | Stapleford ..................... 700/9 |
| 4,047,003 A | * | 9/1977 | LaRocca et al. ................ 700/9 |
| 4,152,134 A | * | 5/1979 | Dowling et al. .............. 700/15 |
| 4,443,861 A | * | 4/1984 | Slater ............................. 710/8 |
| 4,751,672 A | * | 6/1988 | Yamada ......................... 700/7 |
| 5,095,417 A | * | 3/1992 | Hagiwara et al. .............. 700/9 |
| 5,222,017 A | * | 6/1993 | Yellowley et al. ............. 700/3 |
| 5,355,482 A | * | 10/1994 | Ohhashi et al. ............... 700/18 |
| 5,963,444 A | * | 10/1999 | Shidara et al. ................. 700/7 |

* cited by examiner

Primary Examiner—Willbert L. Starks, Jr.
(74) Attorney, Agent, or Firm—Davis & Bujold, P.L.L.C.

(57) ABSTRACT

A method and apparatus for the distributed programmable control of multiple devices, each capable of independent operation and of performing a set of related functions or operations, to operate concurrently or sequentially and in cooperation to perform a predetermined task or operation. A device controller is associated with each process device wherein each device controller controls the operations of the associated process device and includes a process step memory for a storing a device process. Each device process includes one or more device steps wherein each device step corresponds to a process step and controls one or more corresponding operations of the associated process device. A master controller generates step execute identifiers to the device controllers and the device controllers are responsive to the step execute identifiers for cooperatively performing the corresponding device steps of the device processes, generating control outputs corresponding to the device steps to the associated process devices to direct the associated process devices to perform the device steps. The process steps may be generated in the master controller and distributed to the device controllers, or in devices controllers with the master controller coordinating the designation and identification of the device steps in process steps.

2 Claims, 5 Drawing Sheets

DISTRIBUTED PROCESS CONTROL

FIELD OF THE INVENTION

The present invention is directed to a method and apparatus for the distributed control of processes and, in particular, to a system and method for the programmable control of multiple devices, each capable of independent operation and of performing a set of related functions or operations, to operate concurrently or sequentially and in cooperation to perform a predetermined task or operation.

BACKGROUND OF THE INVENTION

There are a large number and wide variety of system or processes that are implemented through or dependent upon the concurrent or sequential cooperative operation or execution of a plurality of devices or process steps wherein each device or step is typically capable of operating or being performed independently and wherein many of the devices are characterized by a plurality of separately controllable functions or operations and the steps may be performed in a number of ways. Examples of such systems or processes include manufacturing or machining processes wherein a "workpiece", which may be a single component or an assembly of components, is operated upon sequentially or concurrently by several devices or tools in one or more steps or operations. Yet another example of such processes or systems include animatronic or robotic applications, such as used in museums, the motion picture industry and amusement parks wherein hydraulically, pneumatically or electrically or electronically controlled actuators or motors are used, for example, to simulate realistic motion, actions and operations of dinosaurs, animals, famous persons, or scaled models of various types. Other examples include chemical or manufacturing processes involving chemical, pressure or temperature controlled processes, such the manufacture of medicines and chemical products, photographic processing, and so on. Still other processes are involved in or include the processing of video, graphic or audio data, such as video or audio programming, communications, data collection and distribution, and text or graphic publishing, as in the newspaper, book or magazine industries.

The devices or tools involved in such processes, and which must be controlled to cooperatively perform a desired task or sequence of operations are typically each capable of independent operation and are each typically designed or intended to perform a single type of operation or function or a set or group of related operations or functions. Examples of such devices or tools may include drilling, grinding and milling heads, cutters, welders and soldering tools, laser devices and various devices for gripping or holding and positioning or translating a workpiece. Yet other examples of process devices may include valves, pumps, printers or printing presses, communications devices, data or video, graphic or audio storage devices. The devices may be, for example, hydraulically, pneumatically or electrically or electronically controlled and the controllable functions or operations of such devices may range, for example, from simple on/off control to rotational or translational movement along various axis, speed, direction and acceleration of movement, power and temperature, and so on. The devices may also sense or measure and indicate transitional or rotational position along various axis, acceleration, speed, and so on, while the primary function of yet other devices may be to sense or measure and indicate transitional or rotational position along various axis, acceleration, speed, and so on. Yet other devices may control temperature, pressure or the flow of chemicals or other fluids, printing processes, information display or presentation, communications operations, and so on.

A continuing problem in such systems and processes, however, is in controlling the operations and functions of the component devices to operate cooperatively to provide the desired results or to perform the desired tasks. Many such systems and processes of the prior art, for example, are program controlled by a single, central processor or computer which may receive position and motion information from the devices and which generates and provides control signals or commands to the devices to control operation of the devices. Such programs, however, are generally complex, time consuming and expensive to design and develop, to debug or to subsequently modify. Centralized control of processes is therefore frequently uneconomical to employ in the machining, manufacture or processing of relatively small numbers of "workpieces" or products. As a result, the machining, processing or manufacture of small quantities of workpieces or products, such as the machining of a prototype part or assembly, a limited printing of a book or magazine, or the processing of a small quantity of film, is generally performed under the direct control of a skilled, trained human operator or team of operators.

Yet other processes are implemented by individual, separate control of the process devices or steps, either sequentially by a single operator or cooperatively by a team of operators. An example of the first instance may be, for example, the machining of a prototype or limited number of "workpieces" by a skill machinist using one or more machining devices. This method, however, is typically slow and requires the services of a skilled and trained operator at each step, and is thereby expensive. An example of the second instance may be, for example, the filming of an animatronic scene in a film production, which are typically performed by team of individual operators, each controlling a few aspects of the animation. This method, however, typically requires many attempts before the necessary cooperation and coordination between the operators is achieved and a scene is successfully filed, so that the method is again slow and uncertain and is thereby frequently very expensive.

These problems of the prior art thereby limit the use of many processes because of the cost and time required to implement the processes as automated processes or the cost and time required for the processes to be performed by skilled, trained operators.

The present invention addresses these and other related problems of the prior art.

SUMMARY OF THE INVENTION

The present invention is directed to a method and apparatus for the distributed control of processes and, in particular, to a system and method for the programmable control of multiple devices, each capable of independent operation and of performing a set of related functions or operations, to operate concurrently or sequentially and in cooperation to perform a predetermined task or operation.

According to the present invention, a process is a sequence of process steps wherein each step is defined by one or more operations of one or more of the process devices. A device controller is associated with each process device wherein each device controller controls the operations of the associated process device and includes a process step memory for a storing a device process. Each device process includes one or more device steps wherein each device step corresponds to a process step and controls one or more corresponding operations of the associated process device. A master controller generates step execute identifiers to the device controllers and the device controllers are responsive to the step execute identifiers for cooperatively performing the corresponding device steps of the device processes, generating control outputs corresponding to the device steps to the associated process devices to direct the associated process devices to perform the device steps. In certain implementations of the present invention, a step execute identifier may further include one or more process controller identifiers identifying the process devices that are to execute a process step identified by a step execute identifier.

A process step typically includes at least one step command directing an operation to be performed by the associated process device and at least one control value indicating an operating state of the associated process device in performing the directed operation, and a device controller typically includes a device interface for translating the step commands and control values of each device step of a device process into control outputs for controlling operation of the associated process device.

In further aspects of the present invention, a step controller may be responsive to a device response output of the associated process device indicating a state of operation of the associated process device for indicating the completion of a device step. The device controller is in turn responsive to a device response output of the associated process device indicating a state of operation of the associated process device for indicating the completion of a device step. The master controller may then be responsive to the indications of the completion of the device steps of a process step by each of the process devices performing a process for generating a next step execute identifier to the device controllers.

In a still further aspect of the present invention, the device processes for the process devices may be generated by the master controller, wherein the master controller may include at least one input device for generating control inputs representing operations of a process device in a device step and a command processor that is responsive to the input device control inputs for generating the device steps of a device process for a process device. The master controller will then provide the device steps to the device controller of the process device for storage in the device controller process step memory.

In yet another implementation of the present invention, the device steps of at least some of the device processes may be generated at or in the process devices, wherein a device controller may include an input device for generating control inputs representing operations of the process device in one or more device steps. In this implementation, the step controller of the device controller will be responsive to the input device control inputs for generating corresponding device steps of a device process for the associated process device and indicating completion of the generation of the device step to the master controller. The master controller may then be responsive to an indication of the completion of the generation of a device step from the device controller for generating a process step write identifier to the device controllers, and the step controllers of one or more device controllers may be responsive to each process step write identifier from the master controller for storing a corresponding device step representing a state of operation of the associated process device in the device controller process step memory of the associated process device.

DESCRIPTION OF THE DRAWINGS

The foregoing and other objects, features and advantages of the present invention will be apparent from the following description of the invention and embodiments thereof, as illustrated in the accompanying figures, wherein.

DETAILED DESCRIPTION OF THE INVENTION

A. General Description of a Distributed Process Control System (DPCS) 10 (FIG. 1)

Figure 1:
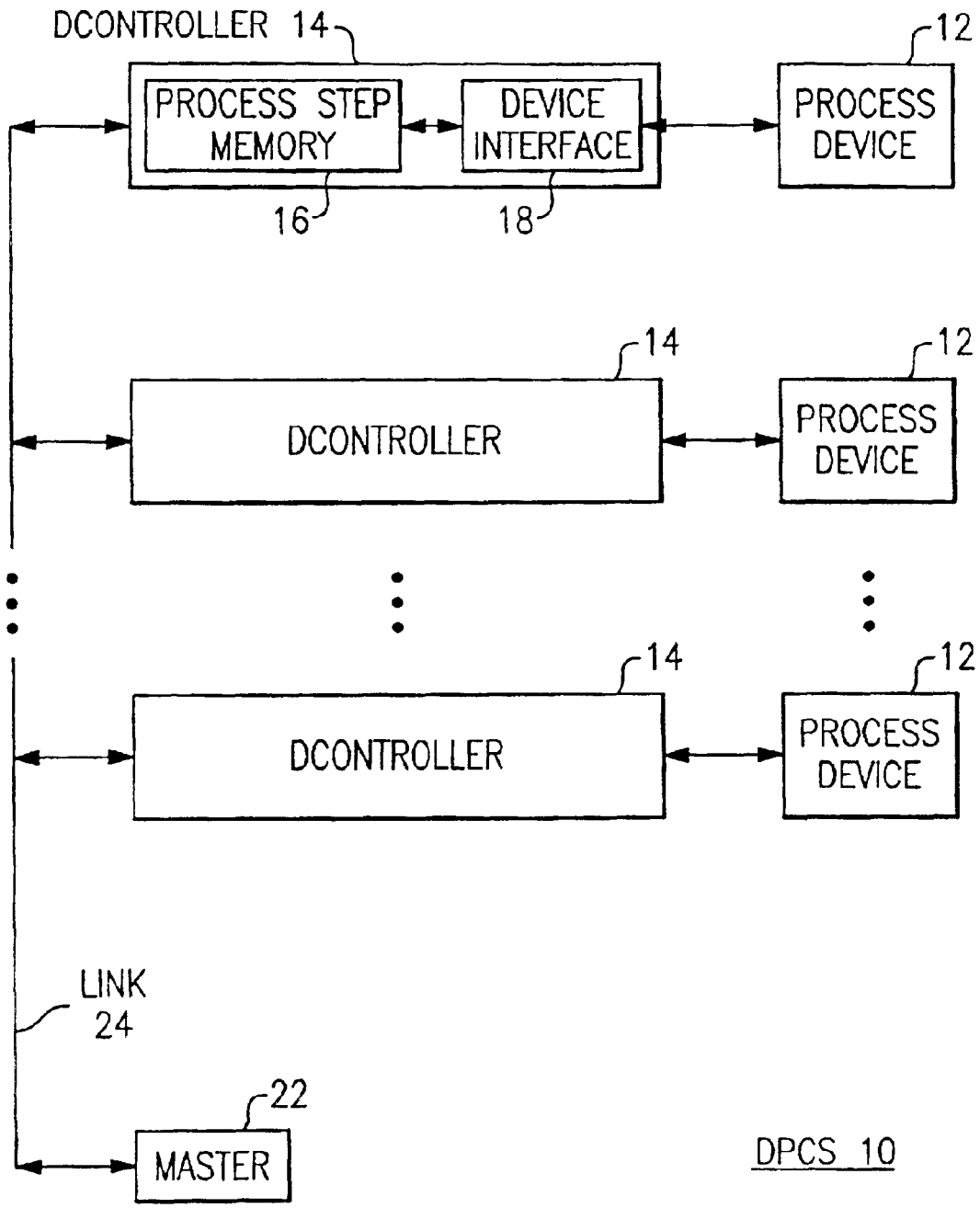
FIG. 1 is a block diagram of an exemplary distributed process control system.

Referring to FIG. 1, therein is shown an illustrative generalized block diagram of a Distributed Process Control System (DPCS) 10 implementing the method of the present invention.

As illustrated in FIG. 1, a Distributed Process Control System (DPCS) 10 includes a plurality of Process Devices (Devices) 12 wherein each Process Device (Device) 12 is or may be used in one or more operations or steps of a process. Each Process Device (Device) 12 is typically capable of operating independently of the other Process Devices (Devices) 12 of the Distributed Process Control System (DPCS) 10 and each Process Device (Device) 12 is typically designed or intended to perform a single type of operation or function or a set or group of related operations or functions. Each Process Device (Device) 12 may be characterized by a plurality of separately controllable functions or operations which may range, for example, from simple on/off control to rotational or translational movement along various axis, speed, direction and acceleration of movement, power and temperature, and so on. Process Devices (Devices) 12 may be, for example, hydraulically, pneumatically or electrically or electronically controlled and examples of Process Devices (Devices) 12 may include drilling, grinding and milling heads, cutters, welders and soldering tools, laser devices and various devices for gripping or holding and positioning or translating a workpiece. Other Process Devices (Devices) 12 may control temperature, pressure or the flow of chemicals or other fluids, printing processes, information display or presentation, communications operations, and so on. Yet other Process Devices (Devices) 12 may include valves, pumps, printers or printing presses, communications devices, data or video, graphic or audio storage devices or may sense or measure and indicate transitional or rotational position along various axis, acceleration, speed, and so on.

According to the present invention, a Device Controller (DController) 14 is associated with each Process Device (Device) 12 and controls the operations, states or functions of each Process Device (Device) 12 in executing process wherein a process is defined as a sequence of process steps wherein each step is defined by one or more operations, states or functions of one or more of the Process Devices (Devices) 12 of the Distributed Process Control System (DPCS) 10. Each step is further defined as beginning with a change in the operation, state or function of at least one Process Device (Device) 12, and as ending when at least one of the Process Devices (Devices) 12 whose operations, states or functions are changing during the step have reached, achieved or completed their directed operations, states or functions. Finally, and also according to the present invention and as a consequence of the operation of the present invention, each of the Device Controllers (DControllers) 14 and their associated Process Devices (Devices) 12 of a Distributed Process Control System (DPCS) 10 executes each of the steps of a process cooperatively.

In this regard, it must be noted that the operation, state or function of each Device Controller (DController) 14 and associated Process Device (Device) 12 in a given step, however, may and often will differ from the operation, state or function of each other Device Controller (DController) 14 and associated Process Device (Device) 12. For example, in a given step, certain Device Controllers (DControllers) 14 and their associated Process Devices (Device) 12 may be directed to each execute a corresponding operation or function to assume a corresponding state, while others of the Device Controllers (DControllers) 14 and their associated Process Devices (Device) 12 may remain idle, or in the operating state defined in the previous step or steps. In other instances, certain Process Devices (Devices) 12 may be directed to execute operations or functions that may continue over multiple steps. In such instances, the Process Devices (Device) 12 is regarded as executing each of the multiple steps in executing the operations or functions that continue over the multiple steps. For example, functions or operations performed by the Process Device (Device) 12 that are continued over multiple steps may be the same during each of the multiple steps, such as holding a constant position or rate of rotation or continuing to move in a given direction along a given axis and at a given rate. It should also be recognized that the defined operation, state or function of a given Device Controller (DController) 14 and associated Process Device (Device) 12 in a given step may be static or dynamic. That is, in a given step a given Process Device (Device) 12 may for example be directed to assume one or more defined rotational or translational positions along various axis or to turn on of off, as in turning a milling head or laser welding tool on or off. In other instances, a Process Device (Device) 12 may for example be directed to move along one or more axis with corresponding defined accelerations until corresponding specified speeds or positions are achieved, or with specified speeds until corresponding positions are reached, or until a specified temperature is reached, and so on.

In order to accomplish the above described functions, and as will also be described in further detail in the following, each Device Controller (DController) 14 includes a Process Step Memory 16 for storing the definitions or specifications of the corresponding operations, states or functions of the associated Process Device (Device) 12 in each step of the process. Each Device Controller (DController) 14 will also include a Device Interface 18 for translating the definitions or specifications of the corresponding operations, states or functions of the associated Process Device (Device) 12 for each step of the process into corresponding Control Outputs 20O to the associated Process Device (Device) 12. In addition, certain Process Devices (Devices) 12 may include facilities to sense or measure and indicate, for example, transitional or rotational position along various axis, acceleration, speed, and so on, which may be provided to the Device Interface 18 as Device Responses 20R. Device Responses 20R, in turn, may be used, for example, in controlling the Process Device (Device) 12 or as an output of the process or in controlling others of the Process Devices (Devices) 12.

As also illustrated in FIG. 1, a Distributed Process Control System (DPCS) 10 further includes a Master Controller (Master) 22 which is interconnected with each of the Device Controllers (DControllers) 14 of the Distributed Process Control System (DPCS) 10 through a Process Control Link (Link) 24. As will described in further detail in following discussions, a primary function of the Master Controller (Master) 22 is to coordinate the operations, states or functions of the Device Controllers (DControllers) 14 and associated Process Devices (Devices) 12 of the Distributed Process Control System (DPCS) 10 in executing the steps of a process. In this regard, the Master Controller (Master) 22 functions to indicate or signal in turn each step of the sequence of steps comprising the process to each of the Device Controllers (DControllers) 14 and associated Process Devices (Devices) 12 of the Distributed Process Control System (DPCS) 10. That is, the Master Controller (Master) 22 will indicate or signal "step one" of the process to the Device Controllers (DControllers) 14, then "step two" of the process, and so on until all steps of the process are completed. In each step, each Device Controller (DController) 14 will in turn direct, command or control the associated Process Device (Device) 12 to execute, perform or assume the corresponding operations, states or functions specified for the associated Process Device (Device) 12 in that step.

It will be recognized, as will be discussed in further detail in the following, that the Master Controller (Master) 22 may issue step commands according to a number of methods. For example, the Master Controller (Master) 22 may issue step commands at predetermined or preprogrammed intervals or under the manual control of an operator which, it should be recognized, need not be a highly skilled and trained operator. In other embodiments, the Master Controller (Master) 22 may issue step commands upon receiving acknowledgments from the Device Controllers (DControllers) 14 that the associated Process Devices (Devices) 12 have each completed the current step. In yet another embodiment, the coordination function of the Master Controller (Master) 22 may be distributed among the Device Controllers (DControllers) 14 such that each Device Controller (DController) 14 initiates the next step of the process upon receiving an acknowledgment from the other Device Controllers (DControllers) 14 that the other Process Devices (Devices) 12 have each completed the current step.

In another aspect of the functions of the Master Controller (Master) 22, the specifications and definitions for each of the steps that are stored in the individual Device Controllers (DControllers) 14 may be generated by and in the Master Controller (Master) 22 and downloaded and stored in the Device Controllers (DControllers) 14. In other embodiment, however, the specifications and definitions for each of the steps may be generated in or by the Device Controllers (DControllers) 14 directly, and by a number of methods. It will also be recognized and understood that a Device Controller (DController) 14 may function both as a Device Controller (DController) 14 and as the Master Controller (Master) 22.

It will therefore be recognized and understood that according to the present invention, the operations or functions of each step of a process are individually and separately defined and controlled in the Device Controllers (DControllers) 14 associated with the Process Devices (Devices) 12, and are executed or performed by the Process Devices (Devices) 12, while the cooperative and coordinated execution or performance of those functions and operations are controlled by the Master Controller (Master)

22. That is, and stated another way, the execution of the steps of a process by the Process Devices (Devices) 12 that perform the operations or functions of the steps is distributed among the Process Devices (Devices) 12 individually, that is, in the Device Controllers (DControllers) 14, while the coordination and cooperative execution of the steps of the process are centralized in the Master Controller (Master) 22 or an equivalent thereof, such as a Device Controller (DController) 14 performing the coordination functions.

B. General Description of a Process (FIGS. 2A and 2B)

Figure 2:
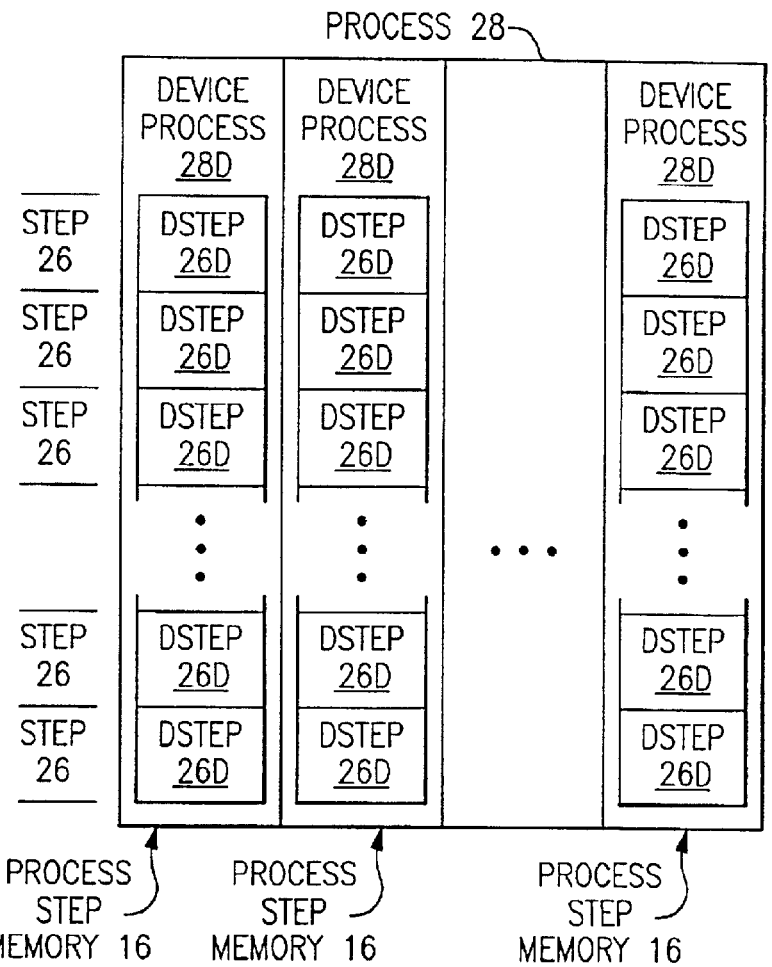
FIGS. 2A and 2B are diagrammatic representations of the distributed device processes of a process.

Referring to FIG. 2A, therein is shown a diagrammatic representation of the Steps 26 of a Process 28 and the distribution of the specifications and definitions each of the Steps 26 of a Process 28 among the Device Controllers (DControllers) 14 controlling the Process Devices (Devices) 12 that perform the operations or functions of the Steps 26.

As discussed above, a Process 28 is defined as a sequence of Process Steps (Steps) 26 wherein each Step 26 is defined by one or more operations, states or functions of one or more of the Process 28 Devices (Devices) 12 of the Distributed Process 28 Control System (DPCS) 10. Each Step 26 is further defined as beginning with a change in the operation, state or function of at least one Process 28 Device (Device) 12, and as ending when at least one of the Process 28 Devices (Devices) 12 whose operations, states or functions are changing during the Step 26 have reached, achieved or completed their directed operations, states or functions. As also described, each of the Device Controllers (DControllers) 14 and their associated Process 28 Devices (Devices) 12 of a Distributed Process 28 Control System (DPCS) 10 executes each of the Steps 26 of a Process 28, and that the specifications or definitions of each of the Steps 26 of a Process 28 that are performed by a given Process Device (Device) 12 resides in the Device Controller (DController) 14 associated with the Process Device (Device) 12.

As represented in FIG. 2A, therefore, a Process 28 is comprised of a plurality of Device Processes (DProcesses) 28D wherein each Device Process (DProcess) 28D resides in the Process Step Memory 16 of a corresponding Device Controller (DController) 14 of a Process Device (Device) 12 involved in the Process 28 and controls the functions, states and operations of the corresponding Process Device (Device) 12 in executing the Process 28. In this regard, it should be noted that a given Distributed Process Control System (DPCS) 10 may include Process Devices (Devices) 12 that are not involved in a given Process 28, and that in such instances the Process 28 need not include a Device Process (DProcess) 28D for an unused Process Device (Device) 12 and that the associated Device Controller (DController) 14 may be set or directed to an idle or off state.

Each Device Process (DProcess) 28D of a Process 28 is in turn comprised of a plurality of Device Steps (DSteps) 26D wherein each Device Step (DStep) 26D corresponds to a Step 26 of the Process 28, so that each Step 26 of a Process 28 is comprised of a plurality of parallel Device Steps (DSteps) 26D wherein each Device Step (DStep) 26D corresponds to one of the Process Devices (Devices) 12 performing the Process 28. In the exemplary Process 28 shown in FIG. 2A, each of the Device Processes (DProcesses) 28D of a given Process 28 is illustrated as containing the same number of Device Steps (DSteps) 26D, which will typically be the instance in many embodiments of the present invention. In such embodiments, each of the Device Controllers (DControllers) 14 and their associated Process 28 Devices (Devices) 12 will execute each of the corresponding Device Steps (DSteps) 26D of a Process 28 in parallel and in the sequence in which the Device Steps (DSteps) 26D are defined and ordered. As such, and as also discussed, the Master Controller (Master) 22 is thereby required only to indicate or command each of Steps 26 in the appropriate order and at the appropriate times to each of the Device Controllers (DControllers) 14 in order to cause the Process Devices (Devices) 12 to operate in coordination to cooperatively execute the Process 28. As will be discussed in following descriptions of Device Controllers (DControllers) 14 and Master Controllers (Masters) 22, however, in certain embodiments of the present invention the Master Controller (Master) 22 may issue one or more device identifiers, or Device Controller (DController) 14 identifiers, in conjunction with the step identifiers. This mode of operation will thereby allow the Master Controller (Master) 22 to identify which of the Device Controllers (DControllers) 14 are to execute or perform a given Step 26, as identified by an accompanying Step 26 identifier. As a consequence, and for example, the Device Processes (DProcesses) 28D thereby need not each contain the same number of Device Steps (DSteps) 26D, or a given Process Device (Device) 12 may remain in a given Device Step (DStep) 26D for two or more Steps 26 of the Process 28, or the Device Processes (DProcesses) 28D may be modified during execution by selecting the Device Steps (DSteps) 26D that will be executed.

As has been described, a given Process Device (Device) 12 may be characterized by one or more separately controllable states, functions or operations which may range, for example, from a simple on/off state to rotational or translational movement along various axis, speed, direction and acceleration of movement, power and temperature, and so on. Correspondingly, and as illustrated in FIG. 2B, each Device Step (DStep) 26D may be comprised of or include one or more Device Step Commands (Step Commands) 30 wherein each Device Step Command (Step Command) 30 defines, specifies, directs or otherwise controls one or more of the separately controllable states, functions or operations of the Process Device (Device) 12, or any mixture or combination thereof. A Device Step Command (Step Command) 30, in turn, may include or be comprised of one or more Function Commands 30F wherein each Function Command 30F may include or be comprised of one or more Instructions 30I and one or more Control Values 30. Each Instruction 30I controls, directs or specifies an operation, state or function of the associated Process Device (Device) 12 while each Control Value 30V states a value or state that the corresponding operation, state or function is to assume or achieve in performing the corresponding Instruction 30I. For example, a given Instruction 30I may indicate a corresponding motor or actuator is to rotate a tool about a corresponding axis and the accompanying Control Value 30V may represent the desired angular rotation or angular position about that axis. In another example, an Instruction 30I may indicate a power on/off control and the accompanying Control Value 30V may indicate whether the corresponding switch or actuator is to assume the on or off state, and so on. In this regard, it must be noted that the Device Step Commands (Step Commands) 30 and/or the Function Commands 30F of a Device Step (DStep) 26D may be executed in parallel or in sequence or in any combination thereof, depending upon the Process Device (Device) 12 and the functions or operations to be performed by the Process Device (Device) 12 in the Device Step (DStep) 26D.

C. Description of a Device Controller (DController) 14 (FIG. 3)

Figure 3:
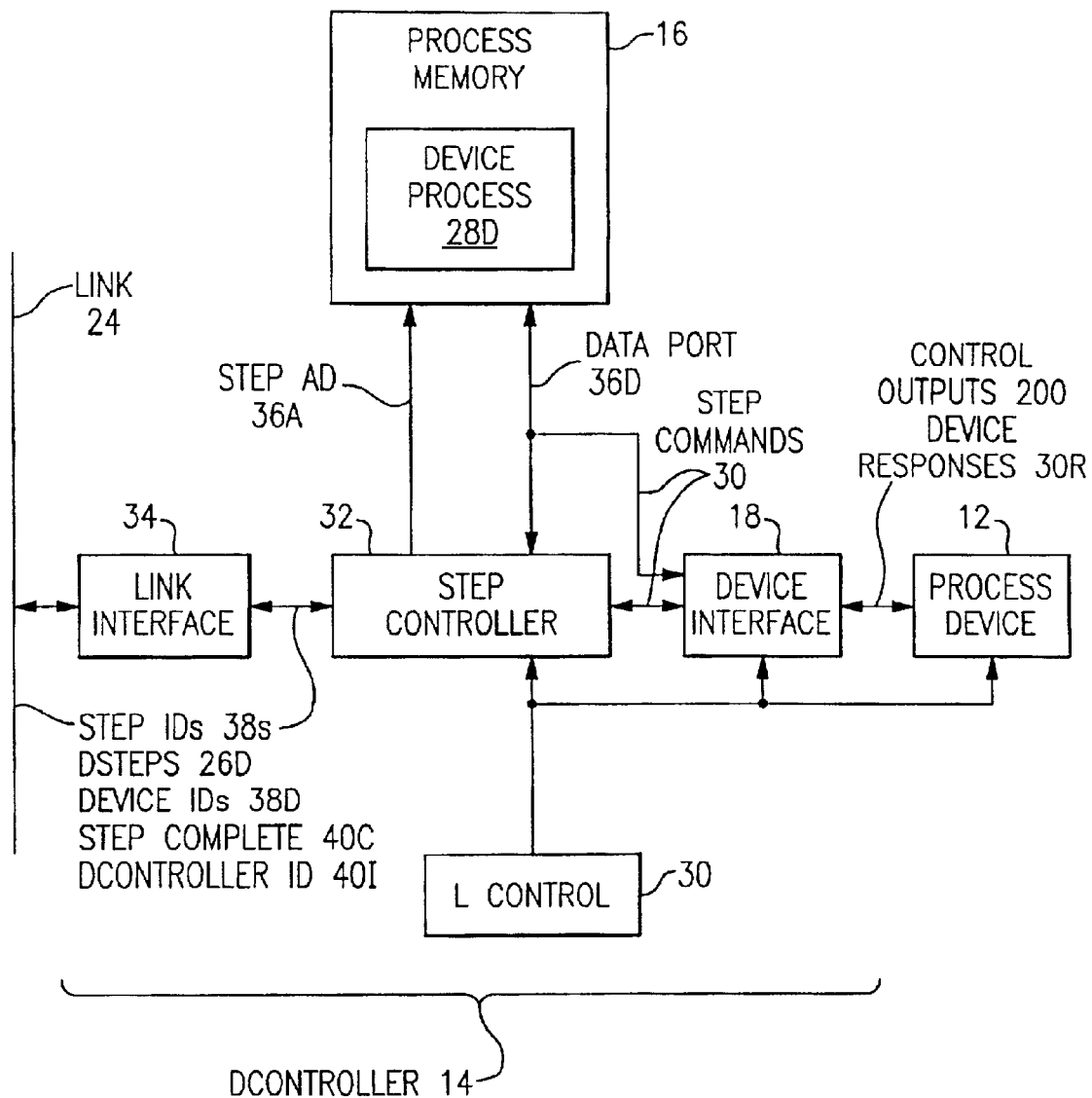
FIG. 3 is a block diagram of an exemplary device controller.

Referring now to FIG. 3, therein is illustrated a block diagram of an exemplary implementation of a Device Controller (DController) 14. As shown therein, a Device Controller (DController) 14 will typically include a Process Step Memory 16, a Device Interface 18, a Step Controller 32 connected between the Process Step Memory 16 and the Device Interface 18, and a Link Interface 34 connected between the Step Controller 32 and Process Control Link (Link) 24.

Step Controller 32 controls the overall operation and functions of the Device Controller (DController) 14 in which it resides, as will be discussed in the following. It will be recognized and understood that Step Controller 32 may be implemented, for example, in a program controlled microprocessor. The operations and functions of Step Controller 32 and of the other elements of the Device Controller (DController) 14 may be controlled, for example, by programs and routines stored in Process Memory 16 or in a separate program memory or by hardwired code stored in a read-only memory, depending upon the degree to which a given Device Controller (DController) 14 is to be dedicated to a specific Process Device (Device) 12 or family of related Process Devices (Devices) 12.

Process Step Memory 16, in turn, stores and provides the Device Steps (DSteps) 26D of a Device Process (DProcess) 28D to the associated Process Device (Device) 12 under the control of Master Controller (Master) 22 and through Device Interface 14, thereby controlling the associated Process Device (Device) 12 in performing a Process 28. As described, each Device Step (DStep) 26D includes one or more Device Step Commands (Step Commands) 30 wherein each Device Step Command (Step Command) 30, in turn, will include one or more Function Commands 30F and wherein each Function Command 30F may include one or more Instructions 30I and may include one or more associated Control Values 30V. Each Device Step (DStep) 26D of a Process 28 is stored in the Process Step Memory 16 at a location identified by a Step Address (StepAD) 36A wherein each Step Address (StepAD) 36A corresponds to a Step 26 of the Process 28. Device Steps (DSteps) 26D are read from a Data Port 36D of the Process Step Memory 16 under the control of Step Addresses (StepADs) 36A generated by Step Controller 32 in response to Step Identifiers (StepIDs) 38S provided from Master Controller (Master) 22 wherein each Step Identifier (StepID) 38S corresponds to a Step 26 of the Process 28. Depending upon the specific implementation Device Controller (DController) 14, and as indicated in FIG. 3, the Instructions 30I and Control Values 30V of the Device Step Commands (Step Commands) 30 of each Device Step (DStep) 26D may be provided directly from Data Port 36D to the Device Interface 14, or may be provided to the Device Interface 14 through Step Controller 32.

The Link Interface 34 resident in each Device Controller (DController) 14 and in the Master Controller (Master) 22 provides an appropriate communications interface and communications functions between the Step Controller 32 of each Device Controller (DController) 14 and the Master Controller (Master) 22 through the Process Control Link (Link) 24 and, if necessary, between the Step Controllers 32 of the Device Controllers (DControllers) 14.

For example, and as discussed above, the Master Controller (Master) 22 communicates with each of the Process Devices (Devices) 12 through Process Control Link (Link) 24 to coordinate the execution of the Device Processes (DProcesses) 28D of a Process 28 by each of the Device Controllers (DControllers) 14. The Master Controller (Master) 22 does so by issuing a sequence of Step Identifiers (StepIDs) 38S wherein each Step Identifier (StepID) 38S corresponds to and identifies a Step 26 of a Process 28 and wherein Step Controller 32 transforms or translates each Step Identifier (StepID) 38S into a corresponding Step Address (StepAD) 36A.

In addition, and in a typical implementation, the Device Processes (DProcesses) 28D of a Process 28 may be generated in and by the Master Controller (Master) 22 and distributed and downloaded to the individual Device Controllers (DControllers) 14 through Process Control Link (Link) 24 and the Link Interfaces 34 residing in the Device Controllers (DControllers) 14. In this regard, Master Controller (Master) 22 may generate and download one Device Step (DStep) 26D at a time, or may generate and download Device Steps (DSteps) 26D in any other desired sequence. For example, the Master Controller (Master) 22 may generate and download all of the Device Steps (DSteps) 26D for one Device Process (DProcess) 28D at a time, or may download corresponding Device Steps (DSteps) 26D of all of the Device Processes (DProcesses) 28D for one Step 26 at a time. In yet other implementations, the Device Processes (DProcesses) 28D for each Device Controller (DController) 14 may be generated in Master Controller (Master) 22 for the Process 28 in their entirety and downloaded in a single transfer.

As represented in FIG. 3, each downloaded Device Step (DStep) 26D is accompanied by a corresponding Step Identifier (StepID) 38S identifying the corresponding Step 26 of the Process 28 and may include a Device Identifier (DeviceID) 38D identifying the specific Process Device (Device) 12 into which the Device Process (DProcess) 28D is to be loaded. In this regard, the Device Identifier (DeviceID) 38D may be transmitted with each Device Step (DStep) 26D or may be transmitted at the start of the sequence of Device Steps (DSteps) 26D comprising the Device Process (DProcess) 28D of a given Device Controller (DController) 14. The Step Controller 32 of the recipient Device Controller (DController) 14 generates Step Addresses (StepADs) 36A corresponding to the Step Identifiers (Step IDs) 38S and writes the Device Steps (DSteps) 26D into the locations in Process Step Memory 16 corresponding to Steps 26 of the Process 28.

The Device Controllers (DControllers) 14 may also be required to indicate the completion of individual Device Steps (DSteps) 26D to the Master Controller (Master) 22, or to provide Device Responses 20R representing a state, operation or function of Process Device (Device) 12 to the Master Controller (Master) 22. As will be discussed below with respect to Device Interface 18, in such instances the Step Controller 32 will operate with the Device Interface 16 to generate and transmit, for example, a Step Complete 40C signal or code to the Master Controller (Master) 22, which may be accompanied by a Device Controller Identifier (DControllerID) 40I. In still other instances, as discussed herein, Device Controllers (DControllers) 14 may be required to communicate among themselves, such as in an implementation wherein a Device Controller (DController) 14 operates as a Master Controller (Master) 22 or in coordinating the execution of Device Steps (DSteps) 26D.

It will be recognized and understood by those of ordinary skill in the arts that the Process Control Link (Link) 24 and the Link Interfaces 34 may be implemented through any suitable communications link, mechanism, bus or protocol suitable and appropriate to the particular Distributed Process Control System (DPCS) 10 and may be bi-directional or uni-directional, as required. As the design and implementation of such Process Control Links (Links) 24 and Link Interfaces 34 are well known and understood by those of ordinary skill in the relevant arts, and will typically be specific to a given implementation of a Distributed Process Control System (DPCS) 10, the specific design and implementation of a Process Control Link (Link) 24 and the Link Interfaces 34 need not be discussed further herein.

Lastly, a Device Controller (DController) 14 will include a Device Interface 18 for translating or transforming the Function Commands 30F and Control Values 30V of the Function Commands 30F of Device Step Commands (Step Commands) 30 into corresponding Control Outputs 20O to the associated Process Device (Device) 12. As has been described, various Process Devices (Devices) 12 will typically be characterized by a plurality of separately controllable functions or operations and may be controlled, for example, hydraulically, pneumatically or electrically or electronically. As such, a primary function of Device Controller (DController) 14 will be to translate or transform Control Values 30V, which will typically be in the form of binary values or codes of various formats, into appropriate forms of Control Outputs 20O. The translation or transformation of binary values or codes into corresponding hydraulic or pneumatic actions or into electrical or electronic signals or commands, however, is well known and understood by those of ordinary skill in the relevant arts and, as such, need not be discussed further herein.

As also described, certain Process Devices (Devices) 12 may include facilities or devices to sense or measure and indicate, for example, transitional or rotational position along various axis, acceleration, speed, and so on, which may be provided to the Device Interface 18 as Device Responses 20R. Device Responses 20R may be used, in turn and for example, in controlling the Process Device (Device) 12, such as in determining when a Process Device (Device) 12 has completed a Device Step (DStep) 26D or a Function Command 30F, as an output of the process, in controlling others of the Process Devices (Devices) 12, or in generating Device Processes (DProcess) 28D of a Process 28. A second function of the Device Interfaces 18 of certain Process Devices (Devices) 12 may therefore be to translate or transform Device Responses 20R into appropriate forms and values comparable to Control Values 30V or Function Commands 30F for use by the Device Controllers (DControllers) 14 and the Distributed Process Control System (DPCS) 10. For example, a Device Response 20R may indicate the completion of an operation of a step or may be a value representing the operation of a Process Device (Device) 12 that Step Controller 32 may compare with a Control Values 30V to generate a Step Complete 40C. It will be appreciated that Device Responses 20R may be presented in a variety of forms, but that the translation or transformation of Device Responses 20R into formats and values usable by the Controllers (DControllers) 14 is well known and understood by those of ordinary skill in the relevant arts and, as such, need not be discussed further herein.

Lastly with regard to Device Interfaces 18, it will be appreciated and understood that certain Process Devices (Devices) 12 or groups or families of Process Devices (Devices) 12 will be related, such as through their operations or functions or the types of processes in which they are used, that they may conform to and use a common set or group of Control Outputs 20, and that Control Outputs 20 and Device Responses 20R may conform to an industry standard. As such, it will be recognized that a given Device Controller (DController) 14 or Device Interface 18 may often be utilized with a number of Process Devices (Devices) 12. Also, Device Controllers (DControllers) 14 may be constructed in modular form, that is, wherein Device Interface 18 is separate from Device Controllers (DControllers) 14 or a modular plug-in for Device Controllers (DControllers) 14, thereby allowing maximum commonality among the design and construction of the Device Controllers (DControllers) 14.

D. Description of a Master Controller (Master) 22 (FIGS. 3, 4 and 5)

Figure 4:
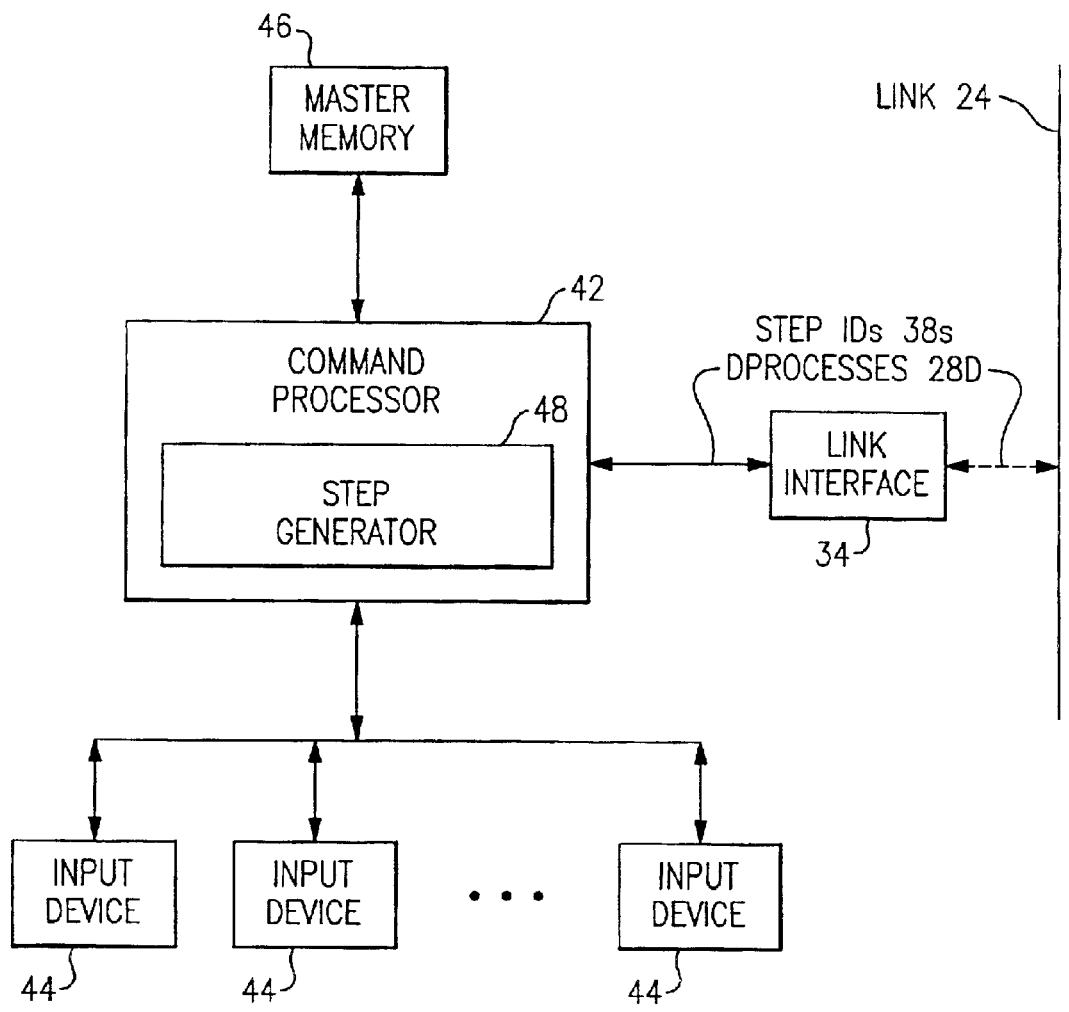
FIG. 4 is a block diagram of an exemplary master controller.
Figure 5:
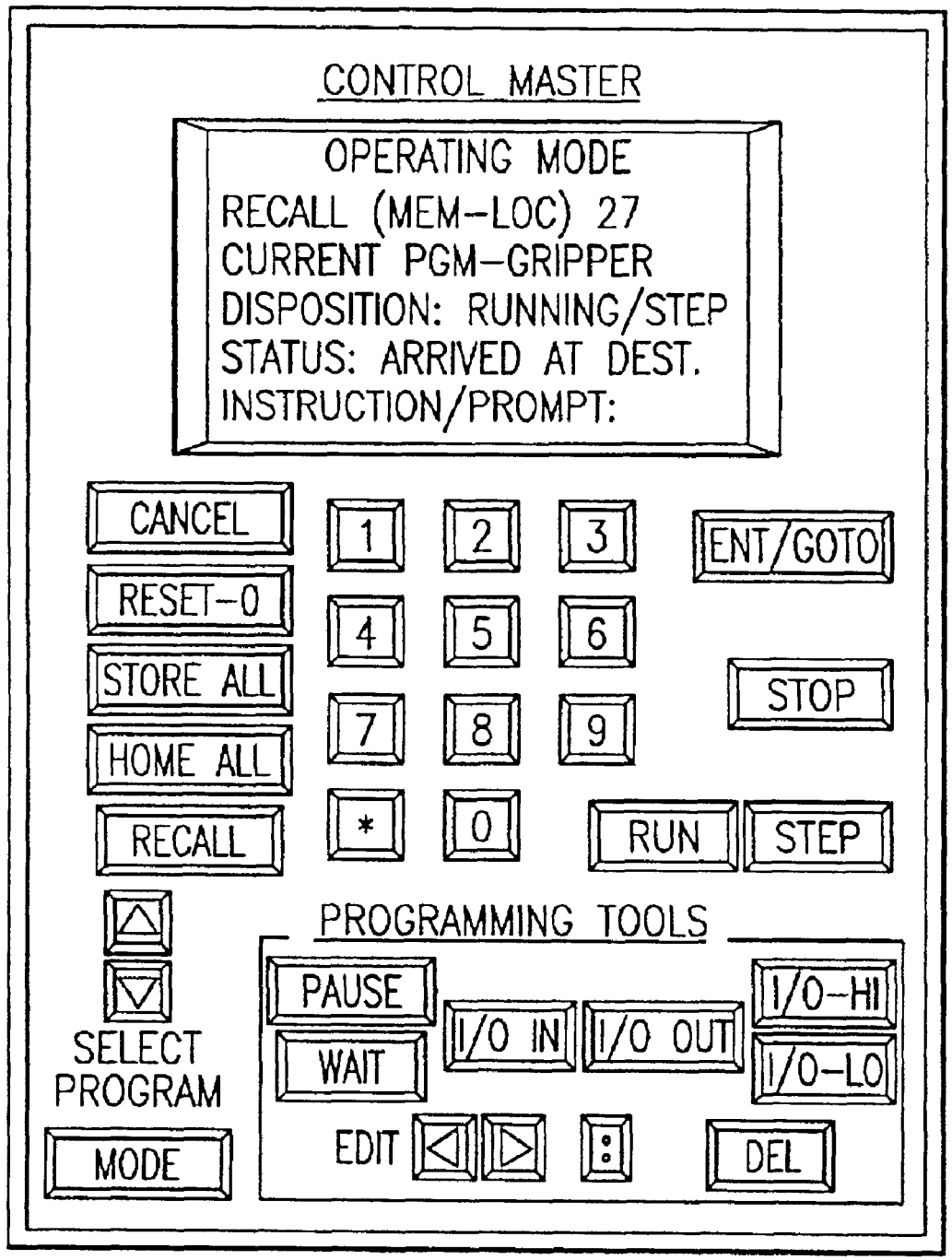
FIG. 5 is an illustration of an exemplary input device of a master controller.

Referring now to FIG. 4, therein is shown a block diagram of a Master Controller (Master) 22, the general operation of which has been discussed above with respect to the operation of Device Controllers (DControllers) 14. As described, the primary function of the Master Controller (Master) 22 is to coordinate the execution of the Device Processes (DProcesses) 28D of a Process 28 by each of the Device Controllers (DControllers) 14 by issuing a sequence of Step Identifiers (StepIDs) 38S corresponding to and identifying the Steps 26 of a Process 28. A second function of the Master Controller (Master) 22 may be to generate the Device Processes (DProcesses) 28D of a Process 28 and download the Device Processes (DProcesses) 28D to the Device Controllers (DControllers) 14.

As illustrated in FIG. 4, a typical Master Controller (Master) 22 will include a Link Interface 34 for communicating with the Device Controllers (DControllers) 14 through the Process Control Link (Link) 24, a Command Processor 42 and one or more Input Devices 44. A Master Controller (Master) 22 may also include a Master Memory 46 for storing Device Steps (DSteps) 26D or Device Processes (DProcesses) 28D in preparation for downloading to the Device Controllers (DControllers) 14.

Among the functions performed by the Master Controller (Master) 22 are the coordination of the execution of Device Steps (DSteps) 26D by the Device Controllers (DControllers) 14 and, for this purpose, the Command Processor 42 will include a Step Generator 48 for generating Step Identifiers (StepIDs) 38S coordinating the execution of Device Steps (DSteps) 26D by the Device Controllers (DControllers) 14 during the performance of a Process 28. As has been described, Command Processor 42 and Step Generator 48 may generate and issue Step Identifiers (StepIDs) 38S to the Device Controllers (DControllers) 14 according to a number of methods. For example, Command Processor 42 may direct Step Generator 48 to issue a next Step Identifiers (StepIDs) 38S upon a manual input from by an operator through an Input Device 44, at predetermined clock intervals, or upon receiving a Step Complete 40C signal or code indicating that a current Step 26 has been completed from each of the Device Controllers (DControllers) 14.

As has also been described, Step Identifiers (StepIDs) 38S are generated by Step Generator 48 during the downloading and storing of Device Steps (DSteps) 26D into the Process Step Memories 16 of the Device Controllers (DControllers) 14 by Master Controller (Master) 22 to control the writing of the Device Steps (DSteps) 26D into the Process Step Memories 16. As discussed, Master Controller (Master) 22 may generate and download the Device Steps (DSteps) 26D of a Process 28 according to a number of methods, and the Command Processor 42 will direct Step Generator 48 to generate and issue Step Identifiers (StepIDs) 38S accordingly. In the instance wherein the Master Controller (Master) 22 generates one Device Step (DStep) 26D at a time under manual control from an Input Device 44, for example, the Command Processor 42 will assemble or format the user inputs into a Device Step (DStep) 26D, generate a corresponding Device Identifier (DeviceID) 38D for the recipient Device Controller (DController) 14, and direct Step Generator 48 to generate an appropriate Step Identifiers (StepIDs) 38S.

Lastly with respect to a Master Controller (Master) 22, in a typical implementation, such as a machining process, the Master Controller(Master) 22 will include a single Input Device 44 which may be, for example, a keyboard and display or a keypad and display unit, through which the operator enters Instructions 30I and Control Values 30V comprising the Device Step Commands (Step Commands) 30 of the Device Steps (DSteps) 26D. A typical example of an Input Device 44 is illustrated in FIG. 5, wherein the Input Device 44 is implemented as a keypad with a liquid crystal display. This Input Device 44 may be embodied, for example, as a separate hand-held unit, as a control/input panel of a console, or in the form of a program generated graphic display, in the manner of the "calculator" that is a standard accessory in Microsoft Windows, and actuated through a touch screen display or by action of a "mouse".

In other implementations, such as animatronics or robotics applications wherein a team of users control, for example, an animated, robotic animal or device, the Master Controller (Master) 22 may include a plurality of Input Devices 44. This plurality of Input Devices 44 may include, for example, a keypad and display Input Device 44 for overall system control, such as just described, and an Input Device 44 for each operator. The Input Devices 44 for the individual operators in this application may be comprised of joystick or trackball units, with each such Input Device 44 corresponding to a Device Controller (DController) 14. In this instance, the control and command inputs from the Input Devices 44 will be digitized Control Values 30V, or input signals that may be digitized into Control Values 30V by the Command Processor 42, and a limited set or variety of switch or "button" inputs. The Command Processor 42 will thereby include a program for translating or transforming such inputs into the Instructions 30I and Control Values 30V of Device Step Commands (Step Commands) 30. For example, the Command Processor 42 program will recognize when the inputs from each Input Devices 44 represent new Device Step Commands (Step Commands) 30, which may be, for example, upon a "button" input from an Input Device 44 or by comparing the previous and current Control Values 30V from an Input Device 44 and recognizing when the difference has exceed a defined range. The Command Processor 42 program will further organize the Device Step Commands (Step Commands) 30 into Device Steps (DSteps) 26D of Device Processes (DProcesses) 28D for the different Device Controllers (DControllers) 14, generating and associating the appropriate Device Identifiers (DeviceIDs) 38D with the Device Step Commands (Step Commands) 30 and Device Steps (DSteps) 26 as necessary. The design and function of such programs are well known and understood by those of ordinary skill in the relevant arts, however, and as such will not be described in further detail herein.

Finally, and referring again to FIG. 3, a Device Controller (DController) 14 may include or be associated with a Local Device Controller (LControl) 50, which may be a Local Device Controller (LControl) 50 normally associated with a given Process Device (Device) 12 or a Local Device Controller (LControl) 50 specifically designed for use with a Device Controller (DController) 14. Depending upon the particular implementation, a Local Device Controller (LControl) 50 may be used to control the associated Process Device (Device) 12, as an alternative to the Device Controller (DController) 14, or may be used in generating Device Processes (DProcesses) 28D for the associated Device Controller (DController) 14. The specific design and implementation of a Local Device Controller (LControl) 50 will depend upon specific uses intended for the Local Device Controller (LControl) 50, such as controlling the Process Device (device) 12 or generating Device Processes (DProcesses) 28D, or both. The input devices of a Local Device Controller (LControl) 50 may include, for example, a keyboard and display, a keypad, a joystick or trackball, and the Local Device Controller (LControl) 50 may include a processor for generating Function Commands 30F, including Control Values 30, or the equivalent thereof.

As indicated, a Local Device Controller (LControl) 50 may be interconnected directly to a Process Device (Device) 12, as when the Local Device Controller (LControl) 50 is a Local Device Controller (LControl) 50 normally associated with a given Process Device (Device) 12. In other implementations, the Local Device Controller (LControl) 50 may be interconnected with the Device Interface 18 or with Step Controller 32. In the first instance, the Local Device Controller (LControl) 50 will directly generate the Control Outputs 20O necessary to control the Process Device (Device) 12, and the Step Controller 32 may receive representations of the current operation or function of the Process Device (Device) 12, such as transitional or rotational positions along various axis, acceleration, speed, and so on, through Device Responses 20R. In the second instance, the Local Device Controller (LControl) 50 will generate the Instructions 30I and Control Values 30V of Device Step Commands (Step Commands) 30 directly, or the equivalent thereof, and Step Controller 32 may be provided with either or both of the outputs of the Local Device Controller (LControl) 50 and Devices Responses 20R. The third instance will be similar to that described above with respect to Input Devices 44 connected to the Command Processor 42 of a Master Controller (Master) 22. That is, the Step Controller 32 will thereby include a program for translating or transforming Local Device Controller (LControl) 50 inputs into Device Step Commands (Step Commands) 30 of the Device Steps (DSteps) 26D of a Device Process (DProcess) 28D for the Device Controller (DController) 14 as described above.

It will be recognized, however, that the local generation of Device Processes (DProcesses) 28D at the Device Controllers (DControllers) 14 will require communication and coordination between and among the Device Controllers (DControllers) 14 and the Master Controller (Master) 22 to coordinate the Device Steps (DSteps) 26D of the Device Processes (DProcesses) 28D into the Steps 26 of a Process 28. For example, each Device Controller (DController) 14 may generate and transmit to the Master Controller (Master) 22 a Step Complete 40C signal or code when the Device Step (DStep) 26D generation program executing in the Step Controller 32 recognizes that a new Device Step (DStep) 26D has been defined. In this instance, the Master Controller (Master) 22 will generate an appropriate Step Identifier (StepID) 38S to each of the Device Controllers (DControllers) 14. Upon receiving a Step Identifier (StepID) 38S from the Master Controller (Master) 22, each of the Device Controllers (DControllers) 14 will generate a Device Step (DStep) 26D from the current inputs of the associated Local Device Controller (LControl) 50 and will store the Device Step (DStep) 26D in the associated Process Step Memory 16. As a result, the resulting Device Processes (DProcesses) 28D residing in each Device Controller (DController) 14 will contain equal numbers of corresponding Device Steps (DSteps) 26D, each identified by a corresponding Step Identifier (StepID) 38S and corresponding to a Step 26 of the resulting Process 28.

In other implementations employing Local Device Controllers (LControls) 50, the Step Controller 32 resident in each Device Controller (DController) 14 may communicate the Device Steps (DSteps) 26D generated in the Device Controller (DController) 14 as the Device Steps (DSteps) 26D are generated. The Master Controller (Master) 22 may then assemble and organize the Device Steps (DSteps) 26D from the various Device Controllers (DControllers) 14 into Device Processes (DProcesses) 28D, as described above with regard to Input Devices 44, and subsequently download the Device Processes (DProcesses) 28D to the Device Controllers (DControllers) 14 as described herein above.

It will be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. A method for distributed programmable control of process devices to operate in cooperation to perform a predetermined process wherein each process device is capable of independent operation and of performing one or more related operations and each process device is associated a corresponding one of a plurality of device controllers wherein each device controller controls the operations of the associated process device as directed by a process stored in the associated device controller and wherein a process is a sequence of process steps wherein each step is defined by one or more operations of one or more of the process devices, comprising the steps of:

storing a device process in each device controller, wherein each device process controls the operations of the associated process device and includes one or more device steps wherein each device step corresponds to a process step and controls one or more corresponding operations of the associated process device; and in a master controller,
      during an execution of a device process, generating only step execute identifiers to each device controller, wherein
         each of the device controllers s responsive to the step execute identifiers for cooperatively performing corresponding device steps of the device processes, in a device controller
      generating and providing to the master controller an indication of a completion of a device step by the associated process device, and in the master controller and responsive to the indication of the completion of a device step of a process step by each of the device controllers directing associated process devices in performing a process,
      generating a next step execute identifier to the device controllers directing the associated process devices in performing a process.

2. A method for distributed programmable control of process devices to operate in cooperation to perform a predetermined process wherein each process device is capable of independent operation and of performing one or more related operations and wherein a process is a sequence of process steps wherein each step is defined by one or more operations of one or more of the process devices, comprising the steps of:

storing a device process in each process device, wherein each device process controls the operations of the associated process device and includes one or more device steps wherein each device step corresponds to a process step and controls one or more corresponding operations of the associated process device; and in a master controller and responsive to a completion of a device step of a process step by each of the process devices performing a process,
      generating a next step execute identifier to the process devices generating step execute identifiers to the device controllers, wherein
      the device controllers are responsive to the step execute identifiers for cooperatively performing corresponding device steps of the device processes.

* * * * *